2,744,914
Patented May 8, 1956

2,744,914

DYESTUFFS OF THE PHTHALOCYANINE SERIES AND THEIR PRODUCTION

Georg Rösch, Leverkusen, Germany, assignor to Farbenfabriken Bayer Aktiengesellschaft, Leverkusen, Germany, a corporation of Germany No Drawing. Application May 29, 1951,
Serial No. 228,987

Claims priority, application Germany May 31, 1950

12 Claims. (Cl. 260—314.5)

This invention relates to the manufacture of new dyestuffs, in particular to the manufacture of new leuco sulfuric esters of vat dyestuffs of the phthalocyanine series.

It is an object of the present invention to provide new dyestuffs of the phthalocyanine series. It is another object of the present invention to provide new leuco sulfuric esters of vat dyestuffs with improved properties for dyeing textile materials.

It is a further object to provide new printing dyestuffs for printing cotton in blue and green shades with excellent fastness to light. Further objects will become apparent as the description proceeds.

It has been found that phthalocyanine sulfonamides wherein the sulfonamide group is N-substituted by one methyl or ethyl and by a leuco sulfuric ester of an anthraquinone may be used as dyestuffs for textiles and especially for printing cotton. The new dyestuffs have the general formula:

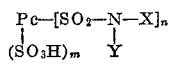

wherein Pc stands for the radical of a metal free or metal containing phthalocyanine such as copper, nickel, or cobalt phthalocyanine and the tetraphenyl substituents thereof, X stands for the radical of the leuco sulfuric ester of an anthraquinone such as anthraquinone or the radicals of the following formulae:

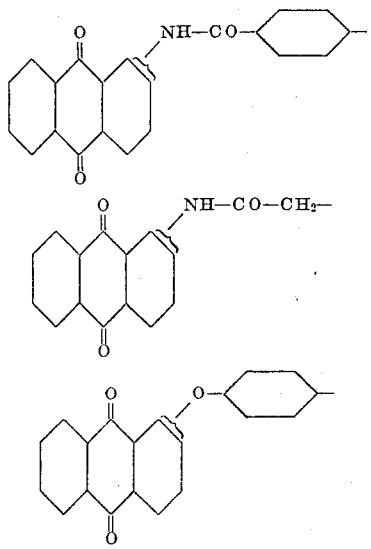

Y stands for methyl or ethyl, and wherein $n$ is an integer from 2 to 4 and $m$ is an integer from 2 to 0, and $n+m$ is not higher than 4.

The new leuco sulfuric esters are converted into the insoluble form of the dyestuff by splitting off the leuco sulfuric groups by conventional methods, e. g. by treatment with a mixture of sodium nitrite and sulfonic acid.

The new leuco sulfuric esters may be produced according to the present invention by reacting phthalocyanine sulfochlorides containing from 2 to 4 sulfochloride groups with the leuco sulfonic esters of anthraquinones which contain one basic amino group having at least one replaceable hydrogen atom, the reaction being accomplished in the presence of a hydrogen chloride acceptor.

Phthalocyanine sulfochlorides suitable in the reaction according to the present invention are the sulfochlorides of copper phthalocyanine; furthermore, the sulfochlorides of cobalt or nickel phthalocyanine or of the metal free phthalocyanine and of the tetraphenyl substituted copper, nickel or cobalt phthalocyanine may also be used. The sulfochloride groups may stand in 4- or 3-position depending upon whether their manufacture is accomplished whilst starting from 4-sulfophthalic acid or whether these groups are incorporated by subsequent sulfonation of the phthalocyanine. The sulfochloride groups of phthalocyanines prepared from polynuclear starting material, such as for instance, from diphenyl-o-dicarboxylic acid, may also be attached to external nuclei. The number of the sulfochloride groups may vary between 1 and 4 and may even be higher when using phthalocyanines obtained from polynuclear starting compounds. The sulfochlorides containing from 2 to 4 sulfochloride groups are preferred. The phthalocyanines may carry further substituents, such as for instance, halogens. A phthalocyanine sulfochloride the composition of which could not be determined as yet, shall also be mentioned. This compound is obtained by reducing the sulfochloride prepared from copper phthalocyanine and chlorosulfonic acid, with zinc dust, reacting the resulting reduction product with monochloroacetic acid in the presence of dilute sodium carbonate solution and treating the reaction product after isolation with chlorosulfonic acid.

Suitable anthraquinone components to be used in the reaction according to the present invention in form of their leuco sulfuric esters are 1- and 2-amino-anthraquinone or derivatives thereof comprising the compounds containing a primary amino group or a methyl- or ethyl-sustituted secondary amino group. The leuco sulfuric esters derived from the 2-methylamino-anthraquinone give rise to dyestuffs yielding dyeings which are especially fast to light. Further suitable derivatives of anthraquinone are compounds containing the reactive amino group not directly attached to the anthraquinone nucleus but to an external group, such as for instance, the 1- or 2-(4'-amino-phenyl) anthraquinonyl ether and the amino-acylamino-anthraquinones, such as for instance, the amino-acetyl- or 2-amino-anthraquinone and the 4'-amino-1- or -2-benzoyl-amino-anthraquinone, as well as the alkyl substitution products thereof. The alkyl, preferably methyl or ethyl, is attached to the reactive amino groups.

The reaction of the phthalocyanine sulfochlorides and the leuco sulfuric esters of the amino-anthraquinones is accomplished in known manner, in the presence of a hydrogen chloride acceptor. The term hydrogen chloride acceptor shall comprise the basic compounds known in the art which owing to their basicity are capable of binding the hydrogen chloride formed without affecting the reaction. Especially suited as hydrogen chloride acceptors are the carbonates of the alkali and alkaline earth metals and organic bases. The introduction of the methyl or ethyl into the molecule may be accomplished before or after the formation of the sulfonamide, i. e. the reaction may be carried out with an N-mono-methyl- or -ethyl-substituted leuco sulfuric ester of the anthraquinone compound. On using leuco sulfuric esters of anthraquinone compounds carrying a primary amino group the hydrogen atom of the basic amino group in the sulfonamide obtained may be substituted by known methods e. g. by alkylation with dimethyl sulfate or diethyl sulfate with addition of sodium hydroxide solution.

It is not absolutely necessary that all sulfochloride groups react with the leuco sulfuric esters of said anthraquinones. However, it may be of advantage to produce a leuco sulfuric ester containing one or two or even more free sulfonic acid groups formed by saponification of the sulfochloride groups. These leuco sulfuric esters are distinguished by an improved solubility and substantivity. As a matter of fact, the number of the free sulfonic acid groups contained in the dyestuff shall not be so high as to impair the fastness of the dyeings to wet treatment. As example of a dyestuff containing free sulfonic acid groups there may be mentioned the product obtained in the reaction of one mol of copper phthalocyanine-4.4'.4''.4'''-tetrasulfochloride and 4 mols of 2-methylamino-anthraquinone-leuco-sulfuric ester, that statistically contains about two and a half anthraquinone radicals and one and a half free sulfonic acid groups. This dyestuff is apparently composed of a mixture of copper phthalocyanine-trisulfonamide-monosulfonic acid and copper phthalocyanine-disulfonamide-disulfonic acid.

The invention is further illustrated by the following examples without being restricted thereto, the parts given being by weight if not otherwise stated.

Example 1

98.4 parts of the sodium salt of copper phthalocyanine-4.4'.4''.4'''-tetrasulfonic acid are dissolved in 1000 parts of chlorosulfonic acid. After one hour's stirring at 80-90° C. 360 parts of thionyl chloride are dropwise added to the solution within one hour while stirring and reflux cooling. The temperature is kept at 80° C. for a further 1-3 hours and after cooling the resulting green solution is poured onto comminuted ice. The precipitated tetrasulfochloride is sucked off, washed neutral with cold water and suspended in 200 parts of water. 256 parts of β-methylamino-anthraquinone-leuco-sulfuric ester containing 37% β-methylamino-anthraquinone and 50 parts of barium carbonate are introduced into the suspension cooled to about 10° C. and the solution thus obtained is stirred for another 12 hours at room temperature. After filtering the solution is concentrated in vacuo to about 200 parts by volume. The dyestuff precipitated by addition of 360 parts of ethanol is sucked off, washed with ethanol and dried at room temperature. 240 parts of a crude product containing 53.5% of the pure dyestuff are thus obtained.

The leuco sulfuric ester very readily dissolves in water to give a green-blue solution from which a clear, greenish blue pigment is precipitated by means of a mixture of sodium nitrite and sulfuric acid. When applied to textiles by the usual methods for printing the dyestuff yields bright, greenish blue shades.

The same dyestuff is obtained by methylating the reaction product of the copper phthalocyanine sulfochloride and the leuco sulfuric ester of β-amino-anthraquinone in the presence of an aqueous solution with excess dimethyl sulfate and a sodium hydroxide solution.

Example 2

100 parts of the sodium salt of copper-phthalo-cyanine-4.4'.4''.4'''-tetrasulfonic acid are introduced into 2650 parts of chlorosulfonic acid and the resulting solution is stirred for 6 hours at 100° C. The cooled green solution is poured onto comminuted ice which is admixed with a small amount of sodium chloride. The precipitated sulfochloride is sucked off and washed neutral with water. 200 parts of the leuco sulfuric ester of 4'-amino-phenyl-2-anthraquinonyl-ether containing 63% 4'-amino-phenyl-2-anthraquinonyl-ether, and 40 parts of barium carbonate are added at 0-10° C. to the suspension of the sulfochloride in 1000 parts of water. The mixture is stirred at room temperature for about 12 hours and thereafter filtered. After concentrating the solution in vacuo to a small volume the sulfonamide is precipitated with ethanol, sucked off, washed with ethanol and dried. 180 parts of a crude product containing 61% of the pure copper phthalocyanine sulfonamide is thus obtained.

The sufonamide is converted into its N-methyl derivative by methylation with excess dimethyl sulfate with the addition of a sodium hydroxide solution. When applied to cotton by printing with the usual methods the dyestuff yields bright, turquoise-blue shades with good fastness properties.

When replacing in the above reaction the sulfochloride obtained from the sodium salt of copper phthalocyanine-4.4'.4''.4'''-tetrasulfonic acid, by the sulfochloride produced from 89.4 parts of tetraphenyl-copper-phthalocyanine and 1690 parts of chlorosulfonic acid as described in Example 7, a green dyestuff is obtained after methylation. This dyestuff yields on cotton bright, green prints with good fastness properties.

Example 3

25.36 parts of the sodium salt of 91.5% copper phthalocyanine-4.4'.4'''-trisulfonic acid are introduced at room temperature into 220 parts of chlorosulfonic acid while stirring. After 6 hours' stirring at 90-100° C. and 12 hours' standing at room temperature the solution is poured onto a mixture consisting of 1100 parts of comminuted ice and 100 parts of sodium chloride. The precipitated phthalocyanine-sulfochloride is sucked off, washed neutral with a 10% solution of sodium chloride and made into a paste with 100 parts by volume of cold water.

A solution of 37.2 parts of the leuco sulfuric ester of 2-amino-anthraquinone containing 30% 2-amino-anthraquinone in 100 parts by volume of water is introduced into the above paste at 0° C. After addition of 7.5 parts of barium carbonate or the equivalent amount of calcium carbonate the solution is stirred for about 12 hours at room temperature. After filtering the solution is concentrated in vacuo at 50-60° C. The reaction product is precipitated by addition of 180 parts of ethanol, sucked off and after-washed with a mixture of 90 parts of ethanol and 10 parts of water and subsequently dried. The yield amounts to 53.3 parts of the crude product containing 29.6 parts of the pure sulfonamide carrying about two anthraquinonyl-sulfonamide radicals and one free sulfonic acid group.

25.2 parts of dimethyl sulfate are dropwise added at 30-40° C. to the solution of 52.8 parts of the leuco sulfuric ester obtained as described above in 150 parts of water and 6 parts of sodium hydroxide are simultaneously added with stirring in small portions. The methylation is complete if a test sample admixed with a sodium hydroxide solution does no longer change from blue to green. Thereupon one part of sodium hydroxide is added to the solution of the methylated dyestuff and 100 parts of water are distilled off in vacuo. The dyestuff is precipitated with 90 parts of ethanol, filtered off and dried at room temperature after washing with ethanol. 41 parts of a leuco sulfuric ester containing 25.4 parts of the pure dyestuff are thus obtained. By printing textile materials in known manner bright, turquoise-blue shades with good fastness properties are obtained.

By replacing in the alkylation the dimethyl sulfate by the equivalent amount of diethyl sulfate, the corresponding N-ethyl-substituted dyestuff is obtained which yields on printing with the usual methods similar shades as the methyl derivative.

Example 4

16.5 parts of the sodium salt of copper phthalocyanine-4.4'-disulfonic acid are dissolved in 200 parts of chlorosulfonic acid. After 2 hours' stirring at 100° C. the solution is cooled and poured onto comminuted ice. The precipitating sulfochloride is sucked off and washed neutral with water. Thereupon 30 parts of the leuco sulfuric ester of 2-methyl-amino-anthraquinone containing 34% 2-methyl-amino-anthraquinone, and 10 parts of pyridine are introduced with stirring at 0° C. into the suspension of the sulfochloride in 200 parts of water. The solution thus obtained is concentrated in vacuo at 50–60° C. to a small volume and the resulting leuco sulfuric ester of the dyestuff is precipitated by adding ethanol, sucked off, washed with ethanol and dried.

The yield amounts to 19 parts of a leuco sulfuric ester yielding on cotton by printing with the usual methods turquoise-blue shades with good fastness properties.

Example 5

57.6 parts of copper phthalocyanine are introduced with stirring into about 1000 parts of chlorosulfonic acid. The resulting solution is heated for 1½ hours at 135° C. and poured after cooling onto comminuted ice. The precipitated sulfochloride is sucked off and washed neutral with water containing sodium chloride. The sulfochloride thus obtained is suspended in 300 parts of water and 255 parts of the leuco sulfuric ester of 1-amino-anthraquinone containing 35% 1-amino-anthraquinone, and 50 parts of barium carbonate or the equivalent amount of calcium carbonate or sodium carbonate are introduced into the suspension at 10° C. The solution is stirred for about 12 hours at room temperature and after concentrating the filtered blue solution in vacuo at 50–60° C. to a small volume, the resulting sulfonamide is precipitated by adding ethanol, sucked off and dried after washing with ethanol. 219 parts of a 70% leuco sulfuric ester corresponding to 153.3 parts of the pure sulfonamide dyestuff containing, according to analysis, three anthraquinonyl-sulfonamide radicals and one free sulfonic acid group, are obtained.

The leuco sulfuric ester thus obtained is N-methylated in an aqueous solution with excess dimethyl sulfate and a sodium hydroxide solution as described in Example 3. The resulting blue dyestuff yields on cotton bright, turquoise-blue prints with good fastness properties.

By replacing the leuco sulfuric ester of 1-amino-anthraquinone by the equivalent amount of the leuco sulfuric ester of 2-methyl-amino-anthraquinone whilst the other conditions of the reaction remain unchanged, a dyestuff with similar properties is obtained.

Example 6

23.2 parts of copper phthalocyanine are dissolved in 350 parts of chlorosulfonic acid. The solution is stirred for another 1½ hours at 135° C. and after cooling is poured onto comminuted ice admixed with some sodium chloride. The precipitating sulfochloride is sucked off, washed neutral with a dilute solution of sodium chloride, and suspended in 100 parts of water. 42 parts of zinc dust are introduced at 0° C. with stirring into the suspension which is stirred for about 12 hours without heating. The resulting blue reaction product is sucked off and after washing with water dissolved in 200 parts of a boiling 5% soda solution. The solution is separated from zinc dust by filtering and mixed with a solution of 20 parts of monochloroacetic acid in 200 parts of a 6% soda solution and gradually heated to boiling. The solution is subsequently acidified with hydrochloric acid and the resulting green precipitate is sucked off. After washing and drying the precipitate is heated in 140 parts of chlorosulfonic acid for 1½ hours at 135° C. After cooling the solution is poured onto comminuted ice, the precipitated sulfochloride is sucked off, washed neutral with water containing sodium chloride and the sulfochloride is suspended in 200 parts of water.

The resulting suspension is mixed with 67 parts of the leuco sulfuric ester of 2-methyl-amino-anthraquinone and 8 parts of barium carbonate, the solution is stirred for a further 12 hours at room temperature and is reduced in vacuo to a small volume after filtering. The sulfonamide is precipitated by adding ethanol, sucked off and dried after washing with ethanol.

A green, easily water-soluble leuco sulfuric ester of the dyestuff is thus obtained which when printed on cotton by the usual methods yields full, bright, green shades with good fastness properties.

Example 7

132 parts of tetraphenyl-copper-phthalocyanine are dissolved in about 2500 parts of chlorosulfonic acid. After stirring for about one hour at 80° C. the cooled solution is poured onto comminuted ice, the precipitated green sulfochloride is sucked off and after washing neutral with water, stirred with 1500 parts of water. 310 parts of the leuco sulfuric ester of 2-amino-anthraquinone containing 43% 2-amino-anthraquinone, and 40 parts of sodium carbonate are introduced at 10° C. into the resulting suspension which is stirred for about 12 hours at room temperature. The resulting green sulfonamide is precipitated by stirring the solution into 1200 parts of ethanol and dried after washing with ethanol. 240 parts of the sulfonamide are thus obtained. 5200 parts of a 37% sodium hydroxide solution and 608 parts of dimethyl sulfate are alternately added in small portions to the solution of the ester in 1500 parts of water. The methylation is complete as soon as a test sample with a sodium hydroxide solution does no longer change to yellow-green.

The leuco sulfuric ester of the dyestuff is precipitated by stirring the solution into 1200 parts of ethanol. After sucking off, after-washing with ethanol and drying 300 parts of the 53% leuco sulfuric ester of the dyestuff are obtained which printed on cotton by the usual methods gives bright, green shades.

Example 8

200 parts of the sodium salt of cobalt phthalocyanine-4.4'.4''.4'''-tetrasulfonic acid are dissolved in 3000 parts of chlorosulfonic acid and stirred for 6 hours at 90° C. The solution is subjected to the treatment described in Example 6 and the resulting sulfochloride is suspended in 2000 parts of water. 570 parts of the leuco sulfuric ester of 2-methyl-amino-anthraquinone containing 33.3% 2-methyl-amino-anthraquinone and 80 parts of barium carbonate are added to the suspension at 0–10° C. After 12 hours' stirring at room temperature the resulting green solution is concentrated in vacuo at 50–60° C. to a small volume and the leuco sulfuric ester of the dyestuff precipitated by the addition of ethanol is sucked off and dried after washing with ethanol. 370 parts of the green leuco sulfuric ester containing 60% dyestuff are thus obtained which when printed on cotton by the usual methods yields green shades.

By replacing in the above reaction the sodium salt of copper phthalocyanine-4.4'.4''.4'''-tetrasulfonic acid by the equivalent amount of the sodium salt of nickel phthalocyanine-4.4'.4''.4'''-tetrasulfonic acid, a leuco sulfuric ester is obtained which when printed on cotton yields covered, blue-green shades.

I claim:

1. The process which comprises treating at temperatures of from about 0° to about 40° C. in the presence of a hydrogen chloride acceptor a phthalocyanine sulfochloride with the leuco sulfuric ester of an anthraquinone containing a basic secondary amino group and having the general formula

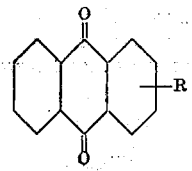

wherein R stands for a radical selected from the group consisting of

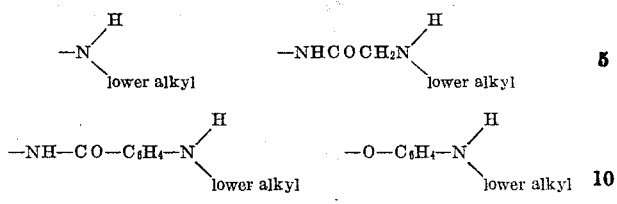

2. The process which comprises treating at temperatures of from about 0° to about 40° C. in the presence of a hydrogen chloride acceptor a phthalocyanine sulfochloride of the general formula $$[(R')_4\text{—Pc—}(SO_2Cl)_n]Me$$

wherein n stands for an integer from 2 to 4, R' being a substituent selected from the group consisting of hydrogen and phenyl, and Me being a metal selected from the group consisting of copper, cobalt and nickel, with the leuco sulfuric ester of an anthraquinone containing a basic secondary amino group and having the general formula

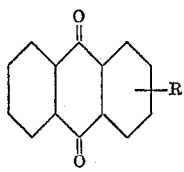

wherein R stands for a radical selected from the group consisting of

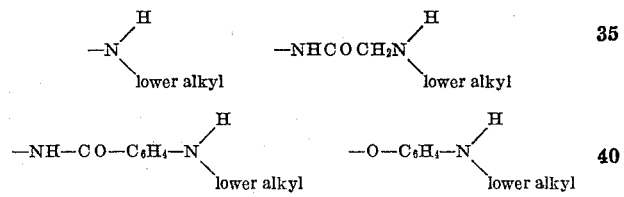

3. The process as claimed in claim 2 wherein the leuco sulfuric ester is selected from the group consisting of the leuco sulfuric ester of 1-methylamino-anthraquinone, 1-ethylamino-anthraquinone, 2-methylamino-anthraquinone, 2-ethylamino-anthraquinone, 2-(4'-methylamino-phenyl)-anthraquinonyl ether, 2-(4'-ethylamino-phenyl)-anthraquinonyl ether, 2-(methylamino-acetyl-amino)-anthraquinone, 2-(ethylamino-acetyl-amino)-anthraquinone, 1-(methylamino-acetyl-amino)-anthraquinone, 1-(ethylamino-acetyl-amino)-anthraquinone, 1-(4'-methylamino-benzoylamino)-anthraquinone, 1-(4'-ethylamino-benzoylamino)-anthraquinone, 2-(4'-methylamino-benzoylamino)-anthraquinone, 2-(4'ethylamino-benzoyl-amino)-anthraquinone.

4. The process which comprises treating at temperatures of from about 0° to about 40° C. copper phthalocyanine-4.4'.4".4'''-tetrasulfochloride with the leuco sulfuric ester of 2-methylamino-anthraquinone in the presence of an alkaline earth metal carbonate.

5. The process which comprises treating at temperatures of from about 0° to about 40° C. tetraphenyl-copper phthalocyanine tetrasulfochloride with the leuco sulfuric ester of 2-methylamino-anthraquinone in the presence of an alkali earth metal carbonate.

6. The process which comprises treating at temperatures of from about 0° to about 40° C. cobalt phthalocyanine 4, 4', 4", 4'''-tetrasulfochloride with the leuco sulfuric ester of 2-methylamino-anthraquinone in the presence of an alkaline earth metal carbonate.

7. A compound of the general formula

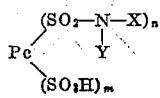

wherein Pc stands for a radical selected from the group consisting of copper phthalocyanine, cobalt phthalocyanine, nickel phthalocyanine, tetraphenyl-copper phthalocyanine, tetraphenyl-cobalt phthalocyanine, tetraphenyl-nickel phthalocyanine and phthalocyanine n is an integer from 2 to 4, m an integer from 0 to 2 and n plus m are at most 4 and wherein X stands for a lower alkyl radical and Y is an anthraquinone radical selected from the group consisting of radicals of the following formula

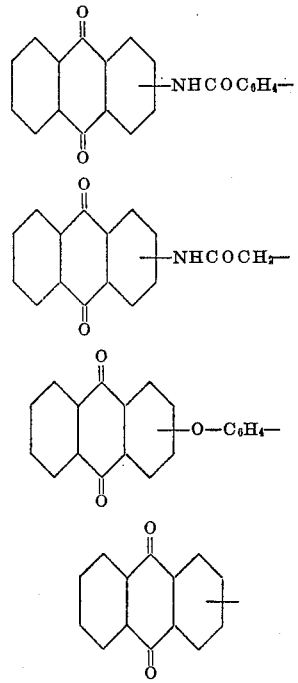

8. As a new compound

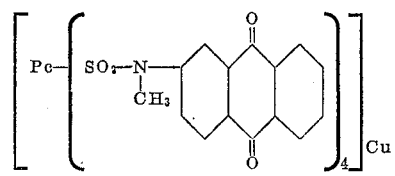

Wherein Pc stands for the phthalocyanine radical.

9. As a new compound

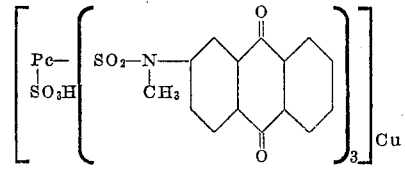

Wherein Pc stands for the phthalocyanine radical.

10. As a new compound

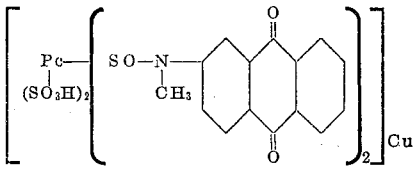

Wherein Pc stands for the phthalocyanine radical.

11. As a new compound

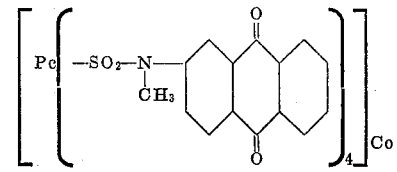

Wherein Pc stands for the phthalocyanine radical.

12. As a new compound
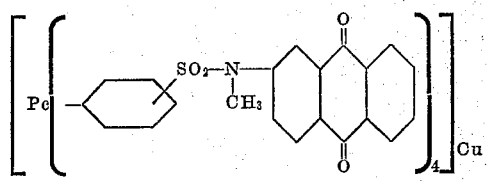
Wherein Pc stands for the phthalocyanine radical.
References Cited in the file of this patent
UNITED STATES PATENTS
2,300,572    Hoyer et al. _____ Nov. 3, 1942
2,493,724    Mayhew _____ Jan. 3, 1950
OTHER REFERENCES
Fiat Report, 1313 (P. B. 85,172) vol. 3, pp. 330–31.